(12) United States Patent
Thomassey (10) Patent No.: US 8,763,949 B2
(45) Date of Patent: Jul. 1, 2014

(54) AIRCRAFT PROVIDED WITH A SWIVELING TAIL ROTOR, AND AN ASSOCIATED METHOD

(75) Inventor: Lionel Thomassey, Fos sur Mer (FR)

(73) Assignee: Airbus Helicopters, Marignane Cedex (FR)

( * ) Notice: Subject to any disclaimer, the term of this patent is extended or adjusted under 35 U.S.C. 154(b) by 241 days.

(21) Appl. No.: 13/314,269

(22) Filed: Dec. 8, 2011

(65) Prior Publication Data

US 2012/0160954 A1 Jun. 28, 2012

(30) Foreign Application Priority Data

Dec. 22, 2010 (FR) ...................................... 10 05016

(51) Int. Cl.
*B64C 27/54* (2006.01)

(52) U.S. Cl.
USPC ...................................... 244/17.13; 244/17.19

(58) Field of Classification Search
USPC ........................ 244/17.13, 17.19, 17.11, 17.21
See application file for complete search history.

(56) References Cited

U.S. PATENT DOCUMENTS

| | | | | | |
|---|---|---|---|---|---|
| 2,959,373 | A | * | 11/1960 | Zuck | ............................. 244/7 C |
| 3,004,736 | A | * | 10/1961 | Culver et al. | .............. 244/17.21 |
| 3,155,341 | A | | 11/1964 | Girard | |
| 3,506,219 | A | | 4/1970 | Mouille | |
| 3,540,680 | A | * | 11/1970 | Peterson | ..................... 244/17.19 |
| 3,977,812 | A | * | 8/1976 | Hudgins | ........................ 416/123 |
| 4,759,514 | A | * | 7/1988 | Burkam | ..................... 244/17.21 |
| 5,269,654 | A | * | 12/1993 | Chapman | ....................... 416/120 |
| 5,749,540 | A | * | 5/1998 | Arlton | .......................... 244/17.13 |
| 6,830,215 | B2 | | 12/2004 | Sandrart | |
| 6,915,983 | B2 | | 7/2005 | Thomassey | |
| 7,137,590 | B2 | | 11/2006 | Sandrart | |
| 7,137,786 | B2 | | 11/2006 | Sandrart | |
| 2004/0232280 | A1 | | 11/2004 | Carter | |
| 2005/0045762 | A1 | | 3/2005 | Pham | |
| 2009/0008498 | A1 | * | 1/2009 | Desroche | ................... 244/17.19 |
| 2010/0327123 | A1 | | 12/2010 | Smith | |

FOREIGN PATENT DOCUMENTS

| | | |
|---|---|---|
| BE | 466905 A | 7/1946 |
| FR | 1017976 A | 12/1952 |
| FR | 1511006 A | 1/1968 |
| FR | 1536412 A | 8/1968 |
| FR | 2831933 A1 | 5/2003 |

(Continued)

OTHER PUBLICATIONS

Search Report and Written Opinion; Application No. FR 1005016; dated Apr. 23, 2011.

(Continued)

*Primary Examiner* — Christopher P Ellis
(74) *Attorney, Agent, or Firm* — Brooks Kushman P.C.

(57) ABSTRACT

An aircraft (1) having an airframe (4) extending from a rear end (4") to a front end (4'), a rotary wing (2), and a tail rotor (10). The aircraft (1) also includes a power plant (20) driving said rotary wing (2) via a main power gearbox (30) secured to a mast (31) of said rotary wing (2), said power plant (20) driving said tail rotor (10) via a tail power gearbox (40). The aircraft possesses pivot means (43) for causing the tail rotor (10) to swivel in a reversible manner from a stationary first position (POS1) towards a second position (POS2). The aircraft also includes tilt means (50) for tilting said mast (31) in a reversible manner.

17 Claims, 3 Drawing Sheets

(56) References Cited

FOREIGN PATENT DOCUMENTS

| FR | 2831934 | A1 | 5/2003 |
|----|---------|----|--------|
| FR | 2831938 | A1 | 5/2003 |
| FR | 2842271 | A1 | 1/2004 |
| GB | 599990  | A  | 3/1948 |
| WO | 2009102739 | A2 | 8/2009 |

OTHER PUBLICATIONS

European Search Report and Written Opinion; Application No. 11009514.8; Dated Oct. 25, 2013.

* cited by examiner

AIRCRAFT PROVIDED WITH A SWIVELING TAIL ROTOR, AND AN ASSOCIATED METHOD

CROSS REFERENCE TO RELATED APPLICATION

This application claims priority to French patent application no. FR 10 05016 filed on Dec. 22, 2010, the disclosure of which is incorporated in its entirety by reference herein.

BACKGROUND OF THE INVENTION

1) Field of the Invention

The present invention relates both to a method of piloting a rotary wing aircraft having a tail rotor that is suitable for pivoting about a swivel axis, and also to such an aircraft.

More particularly, the invention relates to aircraft provided firstly with a rotary wing for providing at least part of the lift of the aircraft, and secondly with a tail rotor suitable for countering the yaw torque generated by the rotary wing on the airframe of the aircraft, said tail rotor being capable of pivoting about an axis in order to contribute to propelling the aircraft.

2) Description of Related Art

The performances of a helicopter are conventionally limited by the speed of rotation of the main rotor that constitutes the rotary wing. In particular, the speed of the blades of the main rotor relative to the surrounding air must remain locally slower than the speed of sound. Thus, at high speed, the lifetime of the components is significantly reduced because of the appearance of vibration and because of the stresses introduced by the mast torser as generated by the cyclic pitch.

Consequently, in order to obtain a rotary wing aircraft capable of traveling at high speed for ecological reasons, e.g. for energy saving purposes, it is possible to make use of an additional source of propulsion, in particular to give access to high forward speed.

Document FR 1 511 006 suggests using a tail-mounted pusher propeller associated with a conventional helicopter antitorque tail rotor. The pusher propeller thus serves to offload the main rotor of at least some of its propulsive functions.

In order to optimize the performance of a helicopter, document FR 1 017 976 suggests using an aircraft provided with a rotary wing and a tail rotor suitable for pivoting about a swivel axis.

In a primary mode of operation, the tail rotor is in a first position in order to counter the torque generated by the rotary wing and in order to control the yaw movement of the aircraft.

In a secondary mode of operation, the tail rotor is swiveled into a second position so as to contribute to propelling the aircraft, with yaw control then being obtained by steering the tail rotor on either side of a neutral position.

Under such circumstances, the first position is referred to for convenience below as the "stationary", first position insofar as the tail rotor is "frozen" in a predetermined position during the primary mode of operation, with the aircraft then operating like a conventional helicopter. Conversely, the second position is referred to for convenience below as the "steerable", second position, insofar as the tail rotor then moves through a predetermined angular sector during the secondary mode of operation.

Such an aircraft is sometimes referred to as a "vector thrust helicopter". Document GB 599 990 also describes an aircraft of that type.

Document U.S. Pat. No. 3,155,341 presents a convertiplane having a main rotor, a swivel-mounted tail rotor, and a wing, which convertiplane is suitable for going from a helicopter mode to an airplane mode. The convertiplane is not a vector thrust aircraft, since the pedals are disconnected from the tail rotor in forward flight.

Document FR 1 536 412 describes a control mechanism for pivoting a tail rotor of a convertiplane. That mechanism has a single outlet relating to controlling the pitch of the tail rotor blades and two inlets for yaw control in helicopter mode and for thrust control in airplane mode, the translation from one kind of control to the other taking place progressively. Thus, in the secondary mode of operation, yaw control becomes inoperative, whereas in the primary mode of operation, thrust control is inoperative.

BRIEF SUMMARY OF THE INVENTION

In this context, an object of the present invention is to propose both a rotary wing aircraft suitable for moving at high speed, while being ecological in terms in particular of fuel consumption, and also a method of piloting such an aircraft.

The technological background includes the following documents: US 2004/232280; FR 2 831 933; FR 2 831 934; FR 2 831 938; FR 2 842 271; WO 2009/102739; US 2005/045762; and FR 1 017 976.

Document US 2004/232280 describes an aircraft having an airframe that extends along an anteroposterior longitudinal plane, the airframe carrying a rotary wing and a tail rotor.

The tail rotor exerts thrust in a constant direction included in the anteroposterior longitudinal plane in order to propel the aircraft. Furthermore, the mast carrying the rotary wing can be tilted towards the rear of the aircraft.

It should be understood that in the text below the term "tilted towards the rear" refers to a mast having a neutral location and presenting relative thereto an acute angle so as to cause the free end of the mast that is secured to the rotary wing to approach towards the tail end of the aircraft. Conversely, in the text below, "tilted towards the front" is used to mean a mast that has a neutral location and that presents an acute angle relative thereto so as to bring its free end closer to the front end of the aircraft.

Such an aircraft is not a vector thrust aircraft insofar as the tail rotor is not steerable to control the yaw movement of the aircraft.

Documents FR 2 831 933, FR 2 831 934, and FR 2 842 271 describe rocking main gearboxes, with document FR 2 831 938 providing an installation for lubricating a rocking main gearbox.

According to the invention, an aircraft is provided with an airframe extending from a rear end to a front end along an anteroposterior longitudinal plane, the airframe having a rotary wing and a tail rotor that is suitable for pivoting so that it occupies either a stationary first position in which the tail rotor serves to control the yaw movement of the aircraft, or else a steerable second position in which the tail rotor pivots about a swivel axis to control the yaw movement and to control the propulsion of the aircraft at least in part, the aircraft operating in a first mode of operation when the tail rotor is in the first position. In addition, the aircraft possesses a power plant driving the rotary wing via a main power gearbox secured to a drive mast of the rotary wing, the power plant driving the tail rotor via a tail power gearbox.

This aircraft is remarkable in particular in that the tail gearbox is provided with a stationary portion secured to the airframe and a movable portion connected to the tail rotor to enable the tail rotor to pivot, and the aircraft comprises:

pivot means for pivoting the movable portion to cause the tail rotor to swivel in reversible manner from the first position to the second position so that the aircraft passes from the first mode of operation to a second mode of operation in which propulsion of the aircraft is provided by the rotary wing and by the tail rotor; and tilt means for reversibly tilting the mast in the anteroposterior longitudinal plane towards the rear end of the aircraft so that the aircraft passes from the second mode of operation to a third mode of operation during which the propulsion of the aircraft is provided solely by the tail rotor.

In order to be able to take advantage of the options, the powertrain must be designed in such a manner that the power needed for the tail rotor does not pass through the main gearbox.

Under such conditions, the aircraft can operate in three distinct modes, a first mode of operation in which the aircraft operates like a conventional helicopter, a second mode of operation in which the aircraft operates like a vector thrust helicopter, unlike document U.S. Pat. No. 3,155,341, and a third mode of operation in which the aircraft operates substantially like an autogyro. These three modes thus enable the aircraft to be adapted to the environment in which it is operating, depending on ecological criteria and/or performance criteria.

The aircraft then combines the advantages of three types of rotary wing rotorcraft in novel manner. Thus, the aircraft can reach relatively high speeds with moderate fuel consumption. The aircraft is then ecological and can travel long distances.

The aircraft can begin its flight by operating in the first mode of operation, e.g. for the purpose of taking off vertically, even though the other modes of operation enable it to take off with a substantial forward speed. The tilt means enable the rotary wing to be tilted towards the front end at a takeoff angle, for example.

During a stage of acceleration that follows takeoff, in order to reach as quickly as possible a setpoint speed that makes it possible to perform the transition from the first mode of operation to the second mode of operation, the tilt means may tilt the rotary wing towards the front end at a transition tilt angle more towards the front having for example an angle of 5° more than the takeoff tilt angle in the takeoff configuration, with this additional tilt angle providing an additional propulsive component.

Thereafter, in order to reach the second mode of operation, the tail rotor is swiveled by the pivot means on the order of the pilot, or of control means requesting swiveling as a function of predetermined parameters such as the forward speed of the aircraft, for example. In parallel, if the rotary wing was tilted towards the front end during an acceleration stage, the rotary wing is optionally returned to its takeoff configuration so as to present the takeoff tilt angle in order to limit the stresses acting on the components of the rotary wing.

The aircraft is then propelled mainly by the tail rotor. The aircraft is then accelerated while operating in this second mode of operation.

Subsequently, in order to reach the third mode of operation, the tilt means tilt the rotary wing towards the rear end of the aircraft. In this third mode of operation, the tilt of the rotary wing enables the rotary wing to provide the aircraft with lift without requiring a large amount of power, or indeed without being driven in rotation at all by the power plant. Furthermore, if the rotary wing is disconnected from the power plant, it is possible to adapt the speed of rotation of the rotary wing independently of the speed of rotation of the tail rotor operating in propulsion mode by varying the tilt angle of the mast.

The power generated by the power plant is then used mainly for driving the tail rotor, with this being associated with the fact that the powertrain that drives the tail rotor does not pass through the main gearbox but exits the power plant directly, said tail rotor alone providing the aircraft with propulsion.

Consequently, the invention makes it possible to tilt the rotary wing towards the rear end of the aircraft in order to put the rotary wing into autorotation, thereby giving it a better fineness ratio (if the rotor is flat) and enabling the main gearbox of the rotary wing to be off-loaded. This tilt angle towards the rear enables the main gearbox to be dimensioned optimally for performing its lift function.

In addition, the latitude made available concerning the tilt angle of the main rotor towards the rear or towards the front enables moments on the drive mast of the rotary wing to be reduced, and thus makes it possible to optimize the dimensioning of the mast, insofar as the main rotor is stressed much less with cyclic controls. This characteristic is particularly true during propulsion of the aircraft by the tail rotor in the third mode of operation. This results in a reduction in the stresses exerted on the rotary wing, and consequently in an increase in the lifetimes of the components and/or a saving in weight compared with a conventional aircraft. The pivoting tail rotor that provides yaw control and vector thrust in the second and third modes provide the aircraft with great maneuverability.

Under such circumstances, and in surprising manner, an aircraft is obtained that is simultaneously ecological, fast, and highly maneuverable.

In order to off-load the rotary wing while going faster, whether in the second mode of operation or in the third mode of operation, the aircraft may be fitted with stationary portions that enable it to receive at least one wing extending on either side of the airframe of the aircraft. Such a wing provides additional lift in forward flight, and can act as a carrier arm for any external loads, and can receive additional tanks in order to increase the operating range of the aircraft, for example.

The combined implementation of pivot means and tilt means, as opposed to mere juxtaposition of such means, makes it possible to obtain an aircraft that is suitable for flying at relatively high speed with fuel consumption that is relatively low.

The aircraft may also include one or more of the following characteristics.

Thus, the tilt means may act reversibly on the mast of a main pivot of the rotary wing, referred to more simply as the "mast" or as the "drive mast", in order to tilt said mast in the anteroposterior longitudinal plane towards the front end of said aircraft in the first mode of operation and in the second mode of operation.

The mast and the associated rotary wing are in a middle position when the mast is tilted neither towards the front end nor towards the rear end, the tilt means being capable of tilting the mast towards the rear end over a first range of 0° to 5°, for example, and towards the front end over a second range of 0° to 5°, for example.

Furthermore, the aircraft may include first disconnection means between the main gearbox and the power plant, such as a freewheel, referred to for convenience as the "front freewheel", for example.

Thus, when the rotary wing is tilted towards the rear end of the aircraft in the third mode of operation, the rotary wing may be set into movement solely by the incident wind. All of the power delivered by the power plant is then transmitted to the tail rotor.

The front freewheel makes it possible in particular to disconnect the rotary wing from the power plant and the tail rotor.

The front freewheel comprises a front driving member driven by the power plant and a front driven member driving the main gearbox. The front freewheel then allows the front driven member to be driven by the front driving member.

Similarly, the aircraft may include second disconnection means between the tail gearbox and the power plant, such as a freewheel referred to for convenience as the "rear freewheel", for example.

The rear freewheel comprises a rear driving member driven by the power plant and a rear driven member driving the tail gearbox. The rear freewheel thus enables the rear driven member to be driven by the rear driving member.

In another aspect, the power plant can include at least one engine engaged with sharer means for sharing the power developed, the sharer means driving a main powertrain connected to the main gearbox, the sharer means also driving a tail powertrain connected to the tail gearbox.

Thus, the rotary wing and the tail rotor are both driven by the sharer means via a respective dedicated powertrain. The sharer means serve to reduce the level of torque seen by the main gearbox, thereby enabling the dimensioning of the main gearbox to be optimized, thus leading to a saving in weight and thus to an increase in payload, and thereby enhancing the ecological nature of the aircraft.

The above-mentioned front and rear freewheels may be included in the sharer means, or they may be located respectively between the sharer means and the rotary wing or the tail rotor.

Furthermore, the rotary wing may have a plurality of first blades having a first variable pitch controlled by flight controls connected to servo-controls actuating a swashplate, and the aircraft may include compensation means so that tilting the mast does not modify the positions of the flight controls and of the servo-controls without action from the pilot.

For example, a crank co-operates with a member affected by the tilt means for the purpose of maintaining the controls in a constant position while the rotary wing is being rocked.

Furthermore, the tilt means may co-operate with the main gearbox to tilt the mast carrying the rotary wing.

Under such circumstances, it can be understood that the tilt means can act directly on the mast in order to tilt it, or indirectly via the main gearbox, for example.

It is then possible to implement a rocking main gearbox of the type described in documents FR 2 831 933, FR 2 831 934, FR 2 831 938, and FR 2 842 271, for example.

In addition to an aircraft, the invention provides a method of piloting such an aircraft having an airframe extending from a rear end towards a front end along an anteroposterior longitudinal plane, the airframe having a rotary wing and a tail rotor, the aircraft having a power plant driving the rotary wing via a main power gearbox secured to a mast of the rotary wing, the power plant driving the tail rotor via a tail power gearbox, the tail gearbox being provided with a stationary portion secured to the airframe and a movable portion connected to the tail rotor, the aircraft including pivot means for pivoting the movable portion to cause the tail rotor to swivel in reversible manner from a stationary first position in which the tail rotor serves to control the aircraft in yaw, to a steerable second position in which the tail rotor pivots about a swivel axis to control the yaw movement and to control at least part of the propulsion of the aircraft, the aircraft including tilt means for tilting the mast in the anteroposterior longitudinal plane towards the rear end or towards the front end on either side of a neutral position, wherein:

during a first mode of operation, the tail rotor is controlled so as to occupy the first position and the rotary wing is controlled so that the mast presents a tilt angle towards the front end lying in the range zero to a first given angle, the speed of the aircraft being controlled by tilting the mast and/or by varying the cyclic pitch of the blades of the rotary wing;

during a second mode of operation, the tail rotor is controlled to occupy the steerable second position and the rotary wing is controlled so that the mast presents a tilt angle towards the front end lying in the range zero to the first given angle; and during a third mode of operation, the tail rotor is controlled to occupy the second position, and the speed of rotation of the rotary wing is controlled by tilting the mast towards the rear end at an angle lying in the range zero to a second given angle.

The position of the tail rotor and the position of the rotary wing may be controlled by controls provided for this purpose, and/or optionally by control means implementing control relationships that have been predetermined by the manufacturer, e.g. as a function of the weight of the aircraft, of the forward speed to be reached, of aerological disturbances, or indeed of altitude and outside temperature.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which.

Elements that appear in more that one of the figures are given the same references in each of them.

DETAILED DESCRIPTION OF THE INVENTION

Figure 1:
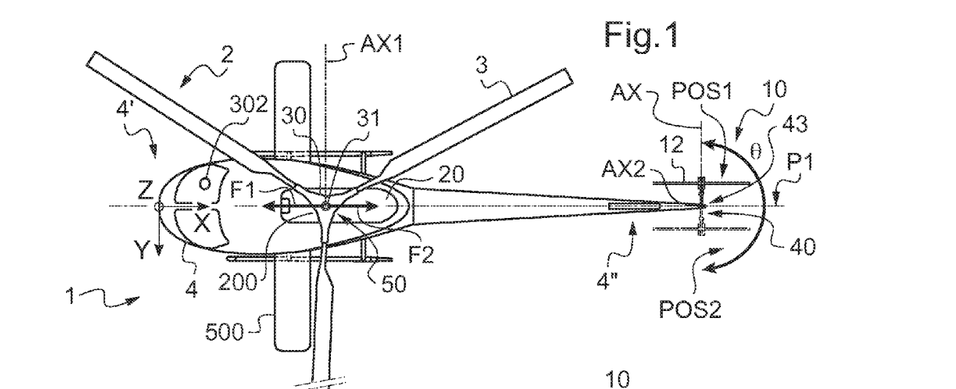
FIG. 1 is a plan view of an aircraft of the invention and serving to explain the process implemented.

FIG. 1 is a plan view of an aircraft 1 of the invention.

Three mutually orthogonal directions referenced X, Y, and Z can be seen in FIG. 1.

The direction X represents the longitudinal axis of the aircraft shown diagrammatically, whereas another direction Y represents the transverse axis of said aircraft.

Finally, a third direction Z is referred to as the "elevation" direction and corresponds to the elevation axis of the aircraft.

FIG. 1 thus shows an aircraft 1 having an airframe 4 extending longitudinally along an anteroposterior longitudinal plane P1 of symmetry in elevation from a front end 4' to a rear end 4". It should be observed that the anteroposterior longitudinal plane P1 is defined by the longitudinal axis X and the elevation axis Z.

The airframe 4 carries a rotary wing 2 having a main rotor made up of a plurality of first blades 3. The aircraft also has members for modifying the first pitch of the first blade 3, such as a set of swashplates controlled by a cyclic stick and suitable for causing the first pitch of the first blade 3 to vary cyclically, and by a collective pitch lever suitable for causing the first pitch of all of the first blades 3 to vary collectively.

In addition, the rear end 4" of the airframe 4 carries a tail rotor 10 having a plurality of second blades 12 that rotate about an axis of rotation AX, the second pitch of the second blades 12 being modifiable.

The tail rotor 10 may also swivel about a swivel axis AX2 to go from a stationary first position POS1 shown in continuous lines, in which first position the tail rotor exerts a force for controlling the yaw movement of the aircraft, to a steerable second position POS2, represented by an angular sector θ in which the tail rotor 10 can be moved within said angular sector θ in order to control the yaw movement of the aircraft and at least contribute to its propulsion.

In the first position POS1, the axis of rotation AX of the second blades of the tail rotor 10 is stationary, e.g. being orthogonal to the anteroposterior longitudinal plane P1 so as to oppose the yaw torque generated by the rotary wing 2 on the airframe 4. In contrast, in the steerable second position, the axis of rotation AX can turn about the swivel axis AX2 in order to direct the mass of air passing through the tail rotor 10 rearwards from the aircraft. The tail rotor 10 thus pivots on either side of the anteroposterior longitudinal plane P1 so as to enable it both to contribute to propelling the aircraft and also to controlling the yaw movement of the aircraft. For example, the angular sector θ through which the axis of rotation of the tail rotor 10 moves may vary over a range of 180° from the position of the tail rotor 10 shown in continuous lines in FIG. 1 to the position of the tail rotor 10 shown in chain-dotted lines in said FIG. 1.

In order to control the tail rotor 10, the pilot may use first control means such as pedals, and second control means, e.g. an analog pushbutton.

In the first position, it is more precisely the first control means that are used for modifying the second pitch of the second blades 12 of the tail rotor 10. Thus, by using the first control means the pilot controls the yaw movement of the aircraft 1 by varying the amplitude of the thrust generated by the tail rotor 10.

In parallel, the second control means 302 are deactivated for safety reasons.

In contrast, in the second position POS2, the first control means are used for steering the tail rotor 10 relative to the anteroposterior longitudinal plane P1, and the second control means are used for modifying the pitch of the second blades 12. Under such circumstances, the pilot continues to control the yaw movement of the aircraft by using the first control means, however the forward speed of the aircraft is then controlled by using the second control means 302, in particular.

The changeover from one position to another of the tail rotor may be requested by switch means operable by the pilot, or indeed by control means as a function of predetermined piloting relationships.

Furthermore, the aircraft 1 includes a power plant 20 for rotating a mast 31 that carries the rotary wing 2, the power plant acting through a main power gearbox 30, said power plant 20 also serving to set the tail rotor 10 into rotation by means of a tail power gearbox 40.

Under such circumstances, the aircraft 1 includes pivot means 43 controlled by the pedals in the second mode in order to change the position of the tail rotor, the pivot means serving to swivel the tail rotor from the stationary first position POS1 towards a second position POS2 that is adjustable within a given angular sector θ, and vice versa.

For example, the tail gearbox has a stationary portion connected to the airframe 4 and a portion that is movable relative to the airframe 4. The pivot means then move the movable portion of the tail gearbox about a swivel axis AX2 relative to the stationary portion of said tail gearbox.

Likewise, the aircraft 1 includes tilt means 50 for tilting the rotary wing in order to move the mast 31 in the anteroposterior longitudinal plane P1 on either side of a neutral position 200 away from the front end 4' towards the rear end 4", and vice versa.

Thus, the tilt means 50 may tilt the mast 31 towards the front as shown by arrow F1 through a forward tilt angle lying in the range 0° and a first given angle, e.g. of the order of 10°. Likewise, the tilt means 50 can tilt the mast 31 towards the rear end along the arrow F2 through a rear tilt angle lying in the range 0° to a second given angle, e.g. of the order of 5°.

This tilting controlled by the member 300 serves both to generate a greater propulsion force and also to control the trim of the aircraft while hovering or in cruising flight as a function of its center of gravity. This makes it possible to reduce drag and improve passenger comfort.

In a first mode of operation, the tail rotor 10 is arranged in the first position POS1.

Figure 2:
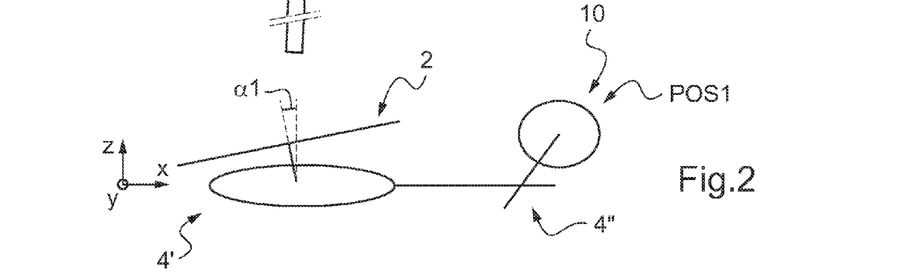
FIGS. 2 to 5 are diagrams explaining the operation of the aircraft.

With reference to FIG. 2, on takeoff, the rotary wing 2 is in a takeoff position such that the mast 31 presents a tilt angle towards the front end 4, e.g. a takeoff tilt angle α1 towards the front end.

Figure 3:
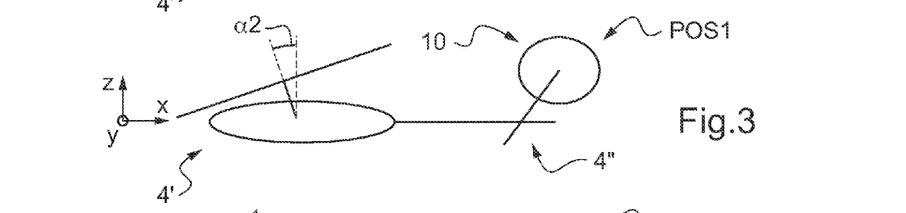

With reference to FIG. 3, after taking off, the rotary wing 2 may be tilted further so that the mast 31 presents a transition tilt angle α2 towards the front that is greater than the takeoff tilt angle α1 as presented during takeoff. In this first mode of operation, an additional forward tilt angle enables the aircraft to fly faster and thus reach more quickly a setpoint speed at which transition to the second mode of operation is authorized, without even having recourse to pivoting the tail rotor.

The aircraft then flies like a helicopter.

Figure 4:
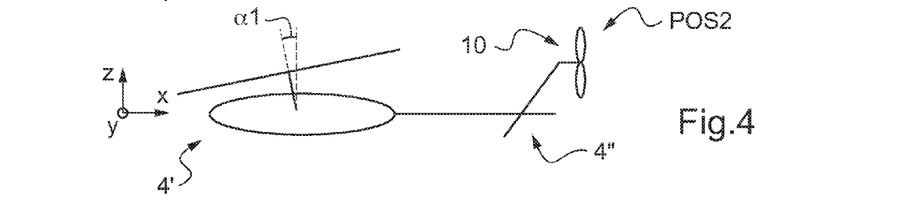

With reference to FIG. 4, during a second mode of operation seeking to accelerate the forward speed of the aircraft, the tail rotor 10 is arranged in the steerable second position POS2 by using the pivot means, and the rotary wing 2 is controlled so that the mast 31 presents a tilt angle towards the front 4' lying in the range zero to a first given angle. The rotary wing 2 may optionally be returned to its takeoff position so that the rotary wing presents the takeoff tilt angle α1 in order to limit the stresses acting on the rotary wing.

A first control means enables the tail rotor 10 to be steered via the pivot means relative to the anteroposterior longitudinal plane P1 within the predefined angular sector 30 in order to control the yaw movement of the aircraft, and second control means modify the second pitch of the second blades 12 of the tail rotor in order to control the forward speed.

Figure 5:
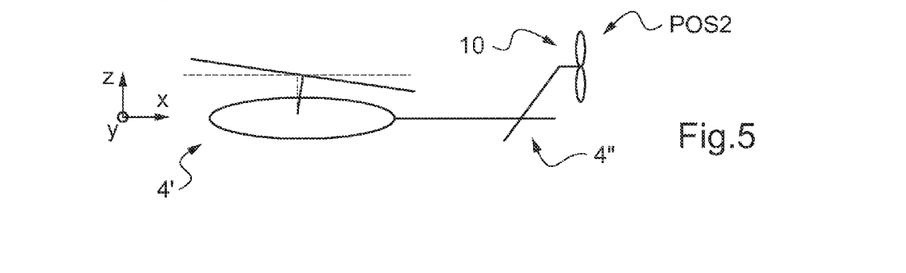

Finally, with reference to FIG. 5, in a third mode of operation, the tail rotor 10 is maintained in the second position POS2, but the rotary wing 2 is controlled so that the mast 31 presents a tilt angle towards the rear end 4" lying in the range zero to a second given angle, e.g. of 5°.

The power from the power plant is delivered at least mainly or even in full to the tail rotor in order to achieve a high forward speed, with this being done by sharer means 70.

The aircraft is then an aircraft that operates in three distinct modes.

With reference to FIG. 1, it may be observed that the aircraft may have a wing 500. In the second and third modes of operation, adding such a wing serves to off-load the rotary wing at high speed. The wing may optionally be fitted with an additional fuel tank and/or means for carrying heavy loads.

The pilot may use switch means for changing mode of operation.

In a variant, it can be understood that an autopilot system may also actuate the switch means 40 as a function of piloting relationships that have been pre-established by the manufacturer.

For example, the changeover from the first mode of operation to the second mode of operation may take place as from a first threshold forward speed. A changeover from the second mode of operation to the third mode of operation is performed in order to minimize the power passing via the main gearbox of the rotary wing while simultaneously sending most of the power generated by the engines of the aircraft to the tail rotor in order to increase the speed of the aircraft. It is also possible to envisage providing means enabling the pilot to override said piloting relationships.

Figure 6:
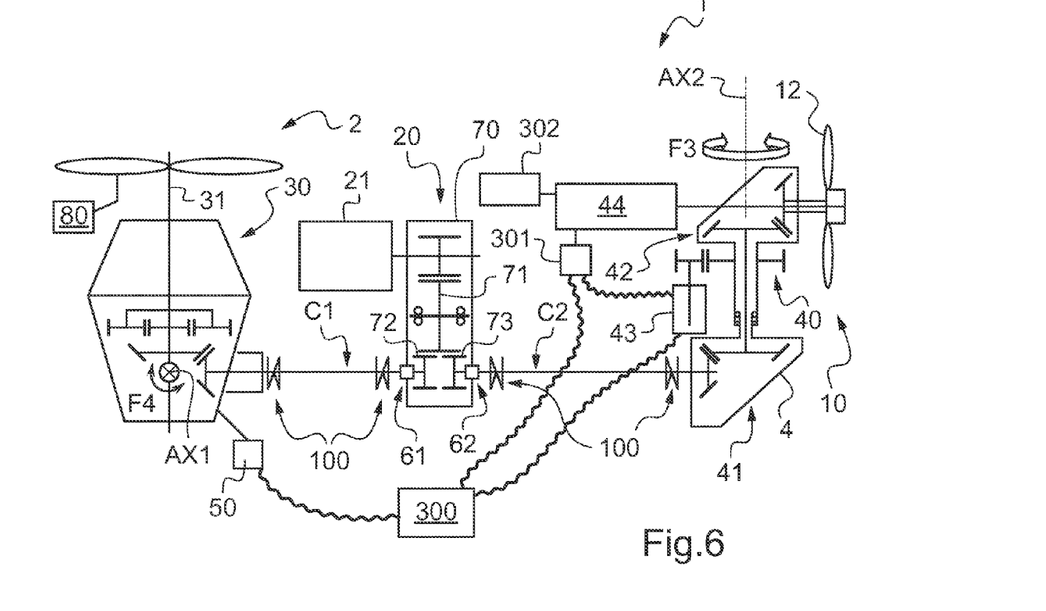
FIG. 6 is a diagram showing the pivot and tilt means.

FIG. 6 is a diagram showing the pivot and tilt means.

The tail gearbox has a stationary portion 41 that is fastened to the airframe 4 and a movable portion 42 that carries the tail rotor 10, and by way of example the pivot means 43 may be constituted by a motor serving to turn the movable portion 42 relative to the stationary portion 41 about a swivel axis AX2.

FIG. 6 also shows control means for controlling the pitch of the second blades 12 of the tail rotor 10.

Furthermore, the tilt means 50 may act on the main gearbox 30 in order to tilt the mast 31, by rocking the main gearbox 30 about a tilt axis AX1 on either side of a neutral location, as represented by the double-headed arrow F4.

In order to drive the main gearbox 30 and the tail gearbox 40, the aircraft has a power plant 20 with at least one engine 21 for driving a main powertrain C1 connected to the main gearbox 30, and a tail powertrain C2 connected to the tail gearbox 40.

Sharer means 70 may be arranged between each powertrain and the engine(s) of the power plant 20.

Under such circumstances, each engine drives distribution gearing 71 of the sharer means 70, the distribution gearing 71 meshing with a front gearwheel 72 connected to the main powertrain C1 and a main gearwheel 73 connected to the tail powertrain C2.

Furthermore, the aircraft 1 may include first disconnection means 61 between the main gearbox 30 and the power plant 20, and second disconnection means 62 between the tail gearbox 40 and the power plant 20. The disconnection means may be of the freewheel or clutch type, for example.

Likewise, a freewheel may be arranged between each engine and the sharer means.

In order to pilot the aircraft 1, a pilot makes use of flight controls 80 acting on the pitch of the first blades of the rotary wing 2, such as a collective pitch lever and a cyclic control stick for acting on the blades of the rotary wing.

Furthermore, the pilot uses first control means 301 of the pedal type, e.g. for controlling yaw movement, or second control means 302 for controlling the thrust generated by the tail rotor in the second and third modes of operation.

Switch means 300, that may be automatic or operable by the pilot, serve to pass from one mode of operation to another.

Whatever the mode of operation, the pilot controls the collective pitch of the first blades of the rotary wing with the collective pitch lever, and controls the cyclic pitch of the first blades of the rotary wing with the cyclic control stick. The tilting of the mast 31 may be managed by the switch means 300, or indeed by a dedicated member, suitable for being controlled by the pilot.

In the first mode of operation, the pilot controls the yaw movement of the aircraft by using the first control means 301, said first control means 301 acting on a servo-control 44 connected to the second blades of the tail rotor.

The second control means 302 are then inactive.

In order to pass from the first mode of operation to the second mode of operation, the switch means 300 cause the pivot means to pivot the tail rotor 10. Beyond an angle threshold, the switch means 300 connect the first control means 301 to the pivot means and activate the second control means 302.

Using the first control means 301, the pilot then controls yaw movement via the pivot motor 43. In addition, the pilot modifies the collective pitch of the second blades 12 in order to manage the thrust delivered by the tail rotor by using the second control means 302 that act on said servo-control 44.

In order to pass from the second operating mode to the third operating mode, the switch means 300 cause the tilt means 50 to tilt the mast 31 towards the rear end 4" of the aircraft at a predetermined angle, which angle may optionally be adjustable using said dedicated member.

Figure 7:
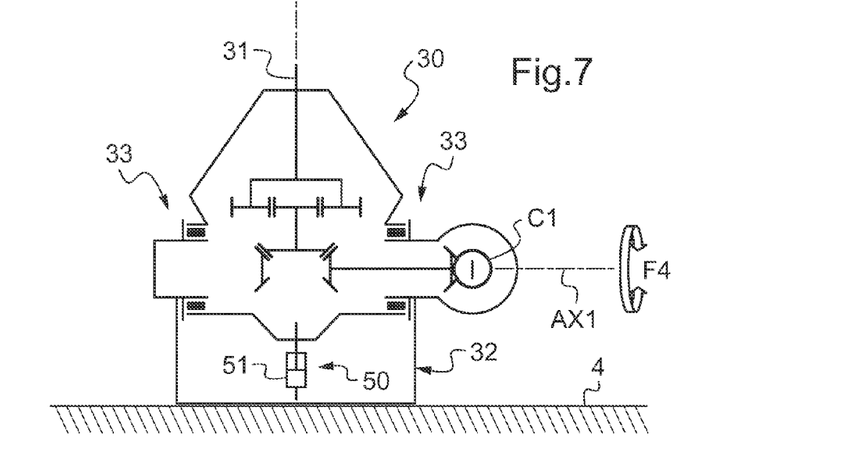
FIGS. 7 and 8 are diagrams showing tilt means co-operating with a main power gearbox.
Figure 8:
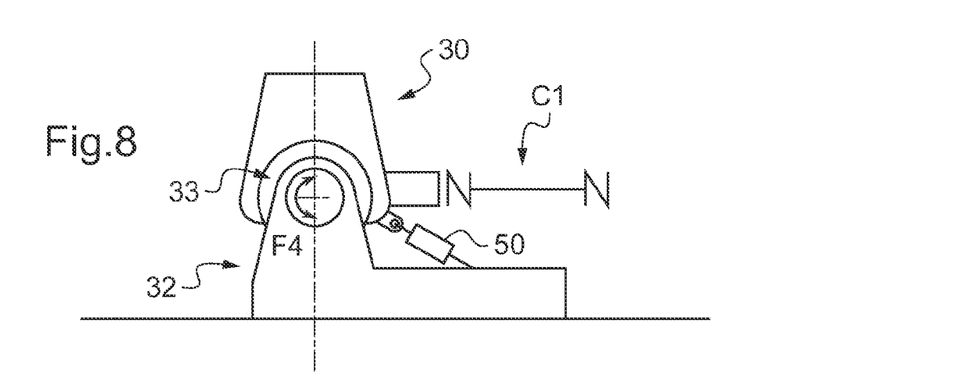

With reference to FIGS. 7 and 8, in order to tilt the mast 31, the tilt means 50 may include an actuator for rocking the main gearbox 30.

This main gearbox 30 is then arranged on a nacelle 32 secured to the airframe 4, e.g. via bearings 33.

Reference may be made to the literature in order to find embodiments of a rocking main gearbox, in particular in association with lubrication means suitable for feeding such a gearbox.

Figure 9:
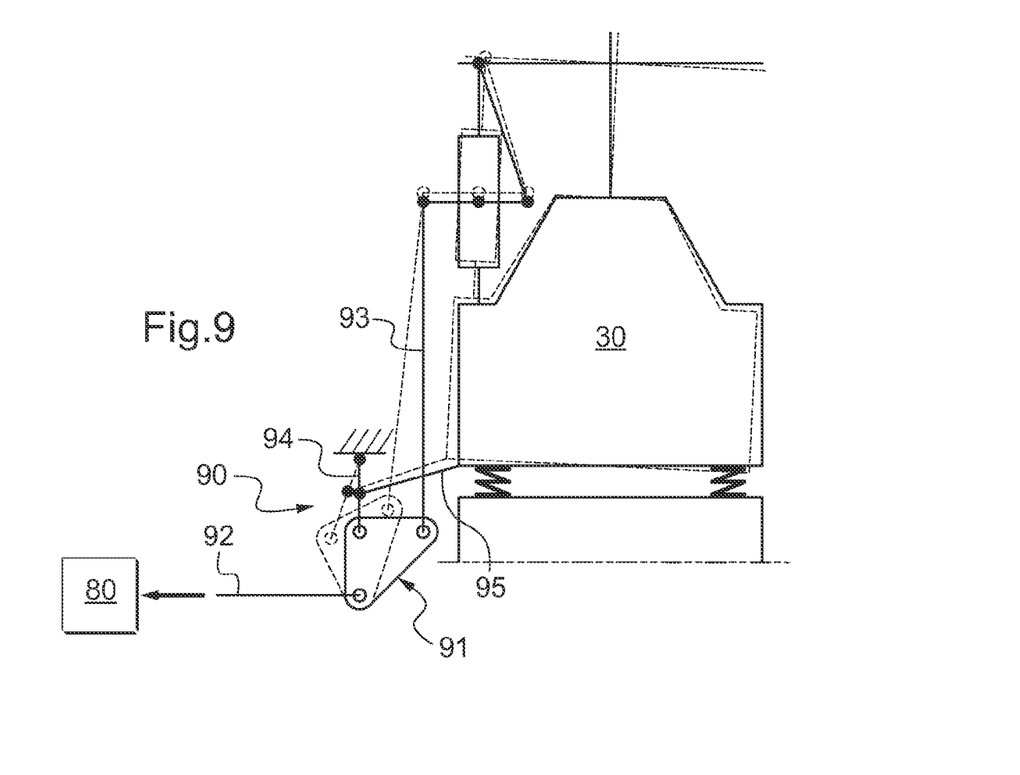
FIG. 9 is a diagram explaining compensation means.

Furthermore, FIG. 9 shows compensation means that serve to avoid causing the servo-control valve from moving when tilting the rotary wing 2 and its mast 31, particularly in the event of the pilot keeping the controls 80 in a constant setpoint position for the cyclic pitch or the collective pitch of the first blades.

The compensation means 90 comprise a crank 91 connected to the flight controls 80 via an inlet rod 92. The inlet rod 92 is then hinged to one end of the crank 91 and to a linkage controlled by said flight controls 80.

In addition, the crank 91 is connected to the valve of the servo-controls for controlling the pitch of the first blades of the rotary wing 2 via an outlet rod 93, and to the airframe 4 via a fastening rod 94.

When the pilot operates the flight controls 80, the crank 91 turns relative to the airframe and exerts a force on the blades, in particular via the outlet rod 93.

Furthermore, the compensation means include a compensation rod 95 hinged to the fastener rod and to the casing of the main gearbox 30.

Tilting the main gearbox 30 then causes the compensation means to move in the manner shown in dashed lines in FIG. 9, this movement not leading to any movement of the flight controls 80 and also not leading to any movement of the valve levers of the servo-controls actuating the cyclic swashplate.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft comprising:
   an airframe extending from a rear end to a front end along an anteroposterior longitudinal plane;
   a rotary wing;
   a tail rotor suitable for pivoting between a stationary first position in which said tail rotor serves to control the yaw of said aircraft and a steerable second position in which said tail rotor pivots about a swivel axis to control the yaw movement and to control the propulsion of said aircraft at least in part, said aircraft operating in a first mode of operation when said tail rotor is in said first position;
   a power plant driving said rotary wing via a main power gearbox secured to a mast of said rotary wing, said power plant driving said tail rotor via a tail power gearbox, wherein said tail gearbox is provided with a stationary portion secured to said airframe and a movable portion connected to said tail rotor to enable said tail rotor to pivot;

pivot means for pivoting said movable portion to cause the tail rotor to swivel in a reversible manner from said first position to said second position so that said aircraft passes from the first mode of operation to a second mode of operation in which propulsion of the aircraft is provided at least by the tail rotor; and tilt means for reversibly tilting said mast in the anteroposterior longitudinal plane towards the rear end of said aircraft so that said aircraft passes from the second mode of operation to a third mode of operation during which the propulsion of the aircraft is provided solely by the tail rotor.

2. An aircraft according to claim 1, wherein said tilt means act reversibly on said mast to tilt said mast in the anteroposterior longitudinal plane towards the front end of said aircraft during the first mode of operation and/or during the second mode of operation.

3. An aircraft according to claim 1, wherein said aircraft includes first disconnection means between said main gearbox and said power plant.

4. An aircraft according to claim 1, wherein said aircraft includes second disconnection means between said tail gearbox and said power plant.

5. An aircraft according to claim 1, wherein said power plant includes at least one engine engaged with sharer means for sharing the power developed, said sharer means driving a main powertrain connected to said main gearbox and driving a tail powertrain connected to said tail gearbox.

6. An aircraft according to claim 1, wherein said rotary wing has a plurality of first blades having a first variable pitch controlled by flight controls connected to servo-controls actuating a swashplate, and said aircraft includes compensation means so that tilting said mast does not modify the positions of said flight controls and of said servo-controls without action from the pilot.

7. An aircraft according to claim 1, wherein said tilt means cooperate with said main gearbox to tilt said mast.

8. An aircraft according to claim 1, wherein said aircraft includes at least one wing extending on either side of said airframe.

9. A method of piloting an aircraft having an airframe extending from a rear end towards a front end along an anteroposterior longitudinal plane, said airframe having a rotary wing and a tail rotor, said aircraft having a power plant driving said rotary wing via a main power gearbox secured to a mast of said rotary wing, said power plant driving said tail rotor via a tail power gearbox, said tail gearbox having a stationary portion secured to said airframe and a movable portion connected to said tail rotor, said aircraft including pivot means for pivoting said movable portion to cause the tail rotor to swivel in a reversible manner from a stationary first position in which said tail rotor serves to control said aircraft in yaw, to a steerable second position in which said tail rotor pivots about a swivel axis to control the yaw movement and to control at least part of the propulsion of said aircraft, said aircraft including tilt means for tilting said mast in the anteroposterior longitudinal plane towards the rear end or towards the front end on either side of a neutral position, said method comprising:

during a first mode of operation, controlling said tail rotor so as to occupy said first position and controlling said rotary wing so that said mast presents a tilt angle towards said front end lying in the range zero to a first given angle;

during a second mode of operation, controlling said tail rotor to occupy said steerable, second position and controlling said rotary wing so that said mast presents a tilt angle towards said front end lying in the range zero to the first given angle; and during a third mode of operation, controlling said tail rotor to occupy said second position, and controlling the speed of rotation of said rotary wing by tilting the mast towards said rear end at an angle lying in the range zero to a second given angle.

10. An aircraft comprising:

an airframe extending from a rear end to a front end along an anteroposterior longitudinal plane;

a rotary wing;

a tail rotor suitable for pivoting between a stationary first position in which said tail rotor serves to control the yaw of said aircraft and a steerable second position in which said tail rotor pivots about a swivel axis to control the yaw movement and to control the propulsion of said aircraft at least in part, said aircraft operating in a first mode of operation when said tail rotor is in said first position;

a power plant driving said rotary wing via a main power gearbox secured to a mast of said rotary wing, said power plant driving said tail rotor via a tail power gearbox, wherein said tail gearbox is provided with a stationary portion secured to said airframe and a movable portion connected to said tail rotor to enable said tail rotor to pivot;

said movable portion being pivotal to cause the tail rotor to swivel in a reversible manner from said first position to said second position so that said aircraft passes from the first mode of operation to a second mode of operation in which propulsion of the aircraft is provided at least by the tail rotor; and a reversibly tiltable mast in the anteroposterior longitudinal plane towards the rear end of said aircraft so that said aircraft passes from the second mode of operation to a third mode of operation during which the propulsion of the aircraft is provided solely by the tail rotor.

11. An aircraft according to claim 10, wherein said mast being tiltable in the anteroposterior longitudinal plane towards the front end of said aircraft during the first mode of operation and/or during the second mode of operation.

12. An aircraft according to claim 10, wherein said aircraft includes a first disconnection means between said main gearbox and said power plant.

13. An aircraft according to claim 10, wherein said aircraft includes a second disconnection means between said tail gearbox and said power plant.

14. An aircraft according to claim 10, wherein said power plant includes at least one engine engaged with sharer for sharing the power developed, said sharer driving a main powertrain connected to said main gearbox and driving a tail powertrain connected to said tail gearbox.

15. An aircraft according to claim 10, wherein said rotary wing has a plurality of first blades having a first variable pitch controlled by flight controls connected to servo-controls actuating a swashplate, and said aircraft includes compensation means so that tilting said mast does not modify the positions of said flight controls and of said servo-controls without action from the pilot.

16. An aircraft according to claim 10, wherein a tilter is provided for cooperating with said main gearbox to tilt said mast.

17. An aircraft according to claim 10, wherein said aircraft includes at least one wing extending on either said of said airframe.

* * * * *